United States Patent [19]
Tomlinson

[11] Patent Number: 5,960,133
[45] Date of Patent: Sep. 28, 1999

[54] WAVELENGTH-SELECTIVE OPTICAL ADD/DROP USING TILTING MICRO-MIRRORS

[75] Inventor: W. John Tomlinson, Princeton, N.J.

[73] Assignee: Tellium, Inc., Oceanport, N.J.

[21] Appl. No.: 09/013,842

[22] Filed: Jan. 27, 1998

[51] Int. Cl.$^6$ ....................................................... G02B 6/26
[52] U.S. Cl. .................................. 385/18; 385/31; 385/37
[58] Field of Search ................................. 385/15–18, 24, 385/31, 27, 33–35, 147

[56] References Cited

U.S. PATENT DOCUMENTS

| | | | |
|---|---|---|---|
| 5,126,836 | 6/1992 | Um et al. | 359/209 |
| 5,199,088 | 3/1993 | Magel | 385/18 |
| 5,210,635 | 5/1993 | Nagata et al. | 359/198 |
| 5,307,358 | 4/1994 | Scheps | 372/20 |

*Primary Examiner*—Akm E. Ullah
*Attorney, Agent, or Firm*—Morgan, Lewis & Bockius LLP

[57] ABSTRACT

An optical switch particularly usable as a wavelength-division add/drop multiplexer (WADM) in a multi-wavelength communication system. Four multi-wavelength beams optically coupled to the input, output, add, and drop channels are arranged in parallel in a rectangular array and are incident upon a diffraction grating. The grating operating in one direction disperses the beams into their wavelength components and operating in the other direction recombines the wavelength components into a multi-wavelength beam. A lens focuses the components of the beams having a particular wavelength upon one of an array of tiltable micro-mirrors integrated on a silicon substrate. In one position, the mirror for a particular wavelength reflects that wavelength component from the input beam back to the output beam. In a second position, that mirror reflects that wavelength component from the input beam back to the drop beam and reflects that same wavelength component from the add beam back to the output beam. The same optics can be used for a second set of beams which are switched in synchronism with the first set. The array of mirrors can be fabricated to be tiltable to more than two positions so that the input beam can be selectively coupled to either the output beam or one of at least two drop beams while the output beam is correspondingly selectively coupled to either the input beam or one of at least two add beams.

15 Claims, 5 Drawing Sheets

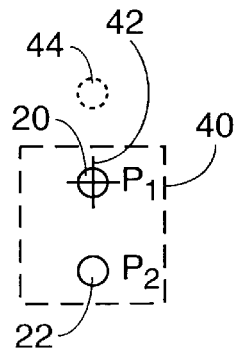
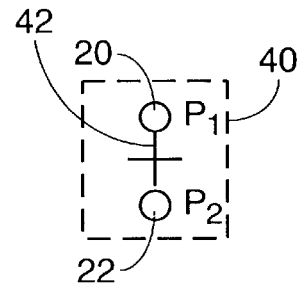
FIG. 4A        FIG. 4B
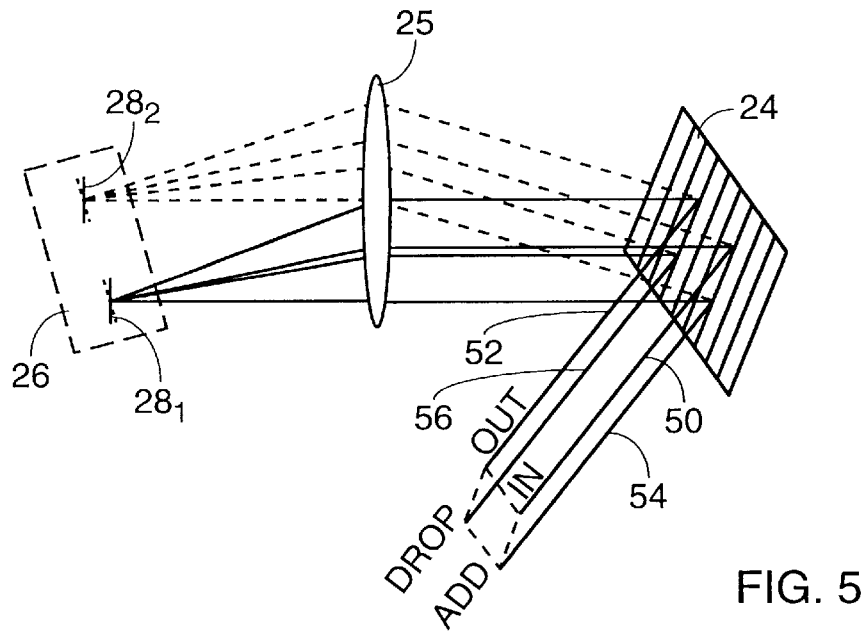
FIG. 5
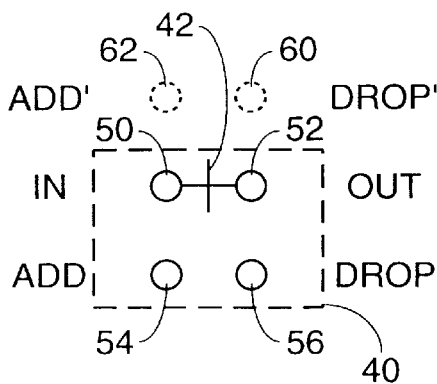
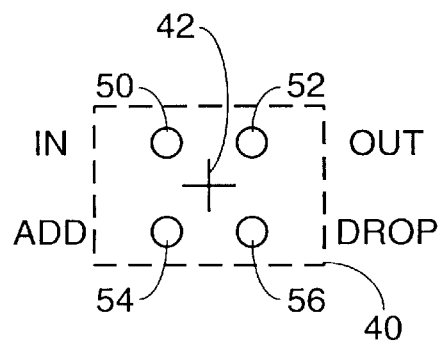
FIG. 6A        FIG. 6B

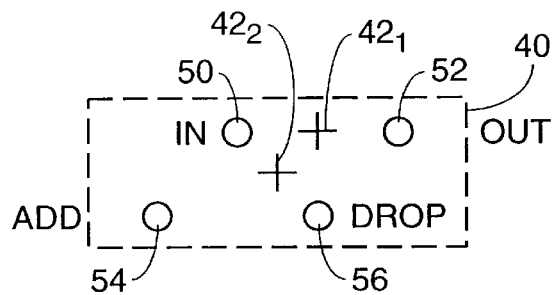
FIG. 7
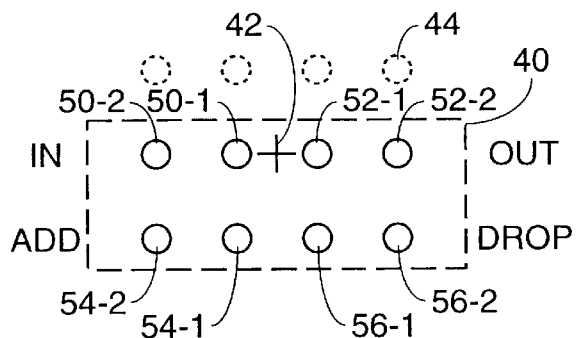 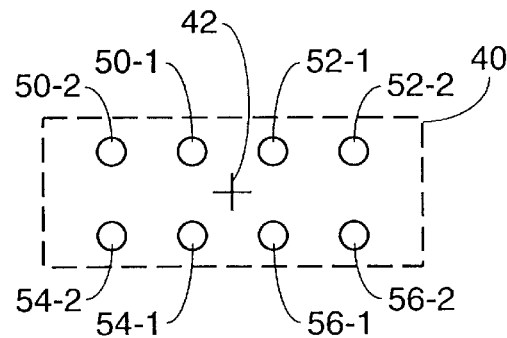
FIG. 8A  FIG. 8B
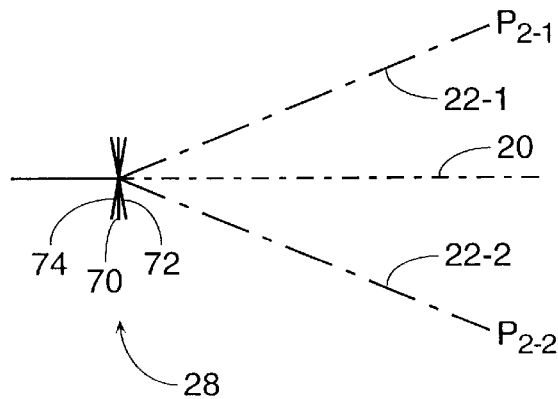
FIG. 9

WAVELENGTH-SELECTIVE OPTICAL ADD/DROP USING TILTING MICRO-MIRRORS

FIELD OF THE INVENTION

The invention relates generally to optical communication systems. In particular, the invention relates to an optical add/drop.

BACKGROUND ART

Communication systems are being increasingly implemented on silica optical fibers that favorably transmit in optical bands around 1300 nm and 1550 nm. In older fiber transmission systems, an optical transmitter modulates a laser emitting in one of these two bands according to an electrical data signal. At the receiving end, an optical detector converts the modulated optical signal to an electrical signal corresponding to the originally impressed data signal. Typically, the capacity of such fiber transmission systems is limited by the opto-electronics at the two ends. Systems having electronic data rates near 2.5 Gb/s are entering service, and systems at 10 Gb/s are being developed. Further significant increases in electronic speed are not anticipated for the near future.

More recent systems have nonetheless multiplied the data capacity of an optical fiber channel by means of wavelength-division multiplexing. The transmitting end includes multiple optical transmitters, each with its own laser, and the respective lasers have slightly different but well determined wavelengths. The separate optical carriers are modulated by respective data signals, and the multiple carriers are then combined (optically multiplexed) onto a single fiber. At the receiving end, the process is reversed. An optical demultiplexer separates the WDM signal into its wavelength-designated components. Separate detectors received the different components and provide separate electrical data signals. WDM systems are being fielded with four wavelengths, and even larger numbers of WDM channels may be feasible in the future.

What has been described to this point is a point-to-point WDM telecommunications system in which all the optical signals are generated and transmitted from one point and are received and detected at another point. That is, opto-electronic conversion is required at each point of a network in which signals need to be switched into or out of transmission path. Such opto-electronic circuitry is expensive.

The most frequent form of electrical multiplexing is time-division multiplexing, in which the transmitted signal is divided into a multiple time slots organized into blocks. One data signal is assigned one slot in each block, and the destination of that data signal may well differ from data signals in adjacent time slots. One of the most fundamental components of a multiplexed electrical communication network is an add/drop multiplexer (ADM). As illustrated in FIG. 1, an add/drop multiplexer 10 receives a transport signal from an input fiber 12 and transmits the transport signal to an output fiber 14. Typically, most of the multiplexed signals pass through the add/drop multiplexer 10 from the input fiber 12 to the output fiber 14 with no change. However, the add/drop multiplexer 10 has the capability to remove one or more of the multiplexed signals from the input fiber 12 and puts them on a drop line 16. Simultaneously, it puts replacement multiplexed signals from an add line 18 onto the output fiber 14.

A wavelength-division add/drop multiplexer (WADM) is greatly desired for WDM communication networks having more than two nodes between which data is transmitted and, usually, selectively switched to other nodes according to wavelength. It is possible to include complete optical-to-electrical-to-optical conversion at the WADM, but the expense is great. It is instead desired to use an all-optical WADM in which one or more wavelengths are selectively dropped and added at the node without the need to convert the optical signals on the fiber to electrical form.

Optical wavelength-selective ADMs have been fabricated by using available wavelength multiplexers and demultiplexers, such as conventional gratings or waveguide array gratings, to demultiplex all the wavelength channels onto individual fibers, using individual 2×2 switches on each single-wavelength fiber to configure it for pass through or add/drop, and then remultiplexing all the signals back onto a single fiber. However, the components used in this approach introduce large losses for the pass-through channels, and the 4 equipment is costly and bulky.

Ford et al. has disclosed a WADM utilizing a linear array of micro electromechanical (MEM) mirrors in "Wavelength-selectable add/drop with tilting micromirrors," *Postdeadline Papers, LEOS '97*, IEEE Lasers and Electro-Optics Society 1997 Annual Meeting, Nov. 10 –13, 1997, San Francisco, Calif., pp. PD2.3, 2.4. A simplified and modified view of the optics 19 of Ford et al. is shown in the schematic diagram of FIG. 2. Two ports $P_1$, $P_2$ provide generally parallel but separated optical paths 20, 22 incident upon a grating 24, which wavelength separates the beams 20, 22 into their respective wavelength components. In the illustration, only two wavelengths are illustrated, the one wavelength by solid lines $20_1$, $22_1$ and the other by dashed lines $20_2$, $22_2$. Importantly, the beams of different wavelengths are angularly separated while those of the same wavelength remain substantially parallel. A lens 25 focuses all the beams onto a micro-mirror array 26 comprising separately tiltable micro-mirrors $28_1$, $28_2$. In the first position of the micro-mirrors $28_1$, $28_2$, illustrated by the solid lines, they reflect light input from the first port $P_1$ directly back to the first port $P_1$. That is, in these first positions, the mirrors are perpendicular to the beams $20_1$, $20_2$. However, in the second position, illustrated by dotted lines, the mirrors $28_1$, $28_2$ reflect light received from the first port $P_1$ to the second port $P_2$. That is, in the second positions the first mirror $28_1$ is perpendicular to the bisector of the beams $20_1$, $22_1$, and the second mirror $28_2$ is perpendicular to the bisector of the beams $20_2$, $22_2$. In the second positions, the mirrors $28_1$, $28_2$ also reflect light received from the second port $P_2$ to the first port $P_1$.

As mentioned, there may be additional mirrors 28 for additional WDM wavelengths, and all the mirrors are separately controllable between their two positions. A tilting angle for the mirrors 28 of about 7° is sufficient. The figure shows neither the collimating lenses associated with the two ports $P_1$, $P_2$, nor a quarter-wave plate disposed between the grating 24 and lens 25 to average out polarization effects of the grating 24, nor a folding mirror arranged in the beam for one of the ports.

Ford et al. incorporate their optics 19 into a wavelength-division add/drop multiplexer illustrated schematically in FIG. 3. The input fiber 12, the output fiber 14 and a bi-directional optical transport path 30 are connected to a first optical circulator 31 such that optical signals received from the input fiber 12 are routed to the bi-directional transport path 30 and signals received from the bi-directional transport path are routed to the output fiber 14. The other end of the bi-directional transport path 30 is connected to the first port $P_1$ of the optics 19, and a bi-directional client path 32 is connected to the second port $P_2$ of the optics 19. The bi-directional client path 32, the optical add line 18 and the optical drop line 16 are connected to a second optical circulator 34 such that signals received from the add line 18 are routed to the bi-directional client path 32 and signals received from the bi-directional client path 32 are routed to the drop line 16.

Considering only one wavelength, if the micro-mirror $28_1$ is set in its retroreflective first position, the multiplexed signal of that wavelength is routed from the input fiber 12 into the optics 19 through the first port $P_1$ and is reflected back out the same port $P_1$ to be thereafter routed to the output fiber 14. However, if the micro-mirror $28_1$ is set in its transreflective second position, the multiplexed signal of that wavelength is instead reflected in a different direction and exits the optics 19 on the second port $P_2$, from where is it routed to the drop line 16. Simultaneously, with the micro-mirror $28_1$ in its second position, a signal received from the add line 18 is routed by the second circulator 34 to the second port $P_2$ of the optics 19 and is transreflected to the first port $P_1$. The first circulator 31 then routes the added signal to the output fiber 14.

An interesting characteristic of the WADM structure of Ford et al. is the inability of the micro-mirrors 28 to retroreflect a signal input from the ADD line 18 through the second port $P_2$ back to the drop line 16. In fact, this is not a problem for an ADM, since an ADM is not usually designed for a connection between the add and the drop lines. However, the Ford device cannot be used as a 2×2 interconnect between two transport paths. An interconnect does require transmission between the ports that Ford et al. label as the add and drop ports.

I have discovered that a good way to visualize the WADM of Ford et al. is shown in FIGS. 4A and 4B, which illustrate the angular arrangements of the beam incident on or reflected from one of the micro-mirrors in the micro-mirror array 26. The beams are shown passing through a spherical surface 40 centered on the first micro-mirror $28_1$ and located between the micro-mirror array 26 and the lens 25. The same basic arrangement exists for all the micro-mirrors 28 so only a single wavelength-separated beam 20, 22 needs to be considered. To be precise, each beam 20, 22 represents an angular range of a conically shaped beam. FIGS. 4A and 4B show the angular relationship between the beams 20, 22 and a normal 42 (represented by a cross) of the tilting mirror 28. In the first mirror position of FIG. 4A, the mirror normal 42 is coincident with the beam 20 from the first port $P_1$ to thereby reflect radiation received from that port directly back to that port. Whatever radiation the mirror 28 receives from the second beam 22 from the second port $P_2$ is reflected to a spurious beam 44, marked by a dashed circle, which is lost from the system. This spurious reflection may be described as resulting from the mirror normal 42 acting as a symmetry direction for reflections of the beam 22. In the second mirror position of FIG. 4B, the mirror normal 42 falls between the two beams 20, 22. That is, the normal is coincident with the bisector of the angle between the two beams 20, 22. As a result, the light that the mirror 28 receives from the first beam 20 through the first port $P_1$ is reflected along the second beam 22 to the second port $P_2$. Also, the light that the mirror 28 receives from the second beam 22 through the second port $P_2$ is reflected along the first beam 20 to the first port $P_1$. Both these reflections can be described in terms of the mirror normal 42 being a mirror point.

The combination of movable mirrors and a grating as shown by Ford et al. has many desirable characteristics and is able to independently add and drop at the ADM any of a number of wavelengths on the transport fiber.

However, this design suffers at least two problems. It requires two circulators to separate signals going in opposite directions on the bi-directional paths 30, 32. Circulators are expensive and add loss. In addition, the experimental results presented by Ford et al. for a device with 200 GHz channel spacings show very sharply peaked channel passbands, rather the desired flat-topped passbands.

A further problem shared by Ford et al. with many types of optical add/drop circuits is that the add and drop lines as well as the input and output lines are wavelength-division multiplexed. For the near future, a WADM represents a demarcation point between a multi-wavelength optical network for transport and an electronic network or digital switch for a client interface. Hence, a WADM having a multi-wavelength add and drop lines requires additional optical multiplexing and demultiplexing on the side of the client interface. As the number of WDM wavelength channels increases, the losses associated with the splitters and combiners begin to significantly impact the system. Equipping the detectors of the receiver with wavelength filters adds to its cost and results in an inflexibility in wavelength assignment.

SUMMARY OF THE INVENTION

The invention may be summarized as an add/drop optical circuit in which four beam paths arranged in a two-dimensional array arc incident upon a tiltable mirror. In one position of the mirror, two of the beams on one side of the array are reflectively coupled. In the other position of the mirrors, respective pairs of beams at opposed diagonal corners of the array are reflectively coupled. The invention may be extended to a multiple-wavelength signal using a grating to complementarily disperse and combine the wavelength components.

The add/drop optical circuit is particularly useful in a wavelength-division multiplexed (WDM) fiber communications network for add/dropping of one or more wavelength channels at a node.

The invention can be further extended to a dual ADM proving synchronous switching of at least two sets of four beam paths, as is particularly useful for two-ring WDM networks in which a working and a protection fiber are synchronously switched at a network node.

Yet another extension of the invention includes an array of tiltable mirrors having three or more positions such that the input and output beams can be routed to one of multiple pairs of add and drop beams.

In another aspect of the invention applicable to many embodiments, the spurious coupling between multiple add and drop lines can be avoided by arranging the beams in a more irregular array.

BRIEF DESCRIPTION OF THE DRAWINGS

FIGS. 4A and 4B are schematic illustrations of the relationship between the mirror angle and the beams in the WADM of FIG. 3.

FIG. 5 is a schematic isometric representation of the wavelength-division add/drop multiplexer.

FIGS. 6A and 6B are schematic illustrations of the angular relationships between the four beams of the WADM of FIG. 5 and one of the micro-mirrors in its two tilting positions.

FIG. 7 is a schematic illustration of the angular relations between the four beams and the micro-mirror in a generalized arrangement of the beams.

FIGS. 8A and 8B are schematic illustrations of the angular relationships between the eight beams of a dual WADM and one of the micro-mirrors in its two tilting positions.

FIG. 9 is a schematic representation of the three positions of tiltable mirror providing the ability to selectively couple input and output beams to more than one set of add and drop lines.

DETAILED DESCRIPTION OF THE PREFERRED EMBODIMENTS

Figure 1:
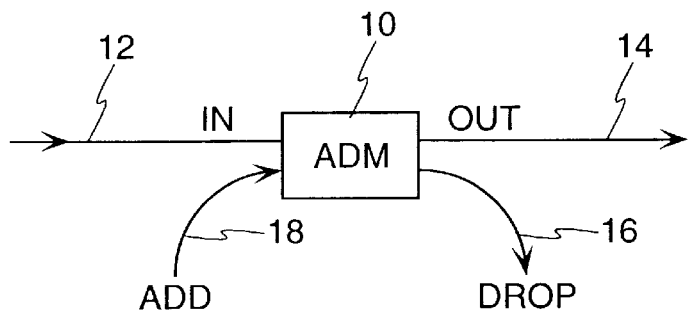
FIG. 1 is schematic illustration of the functions of an add/drop multiplexer.

The wavelength-division add/drop multiplexer (WADM) of Ford et al. uses two bi-directional beam paths with respective ports to from its optics section. Necessarily, the two beam paths are arranged in a linear array. I propose, as illustrated in the isometric view of FIG. 5, the use of four parallel, directional, input and output beam paths 50, 52, 54, 56 arranged in a two-dimensional array. The four beams in this arrangement are the input beam 50, the output beam 52, the add beam 54, and the drop beam 56, the input and add beams 50, 54 propagating oppositely from the output and drop beams 52, 56. The four beams are incident on the diffraction grating 24, which wavelength separates the beams into the same wavelength-dispersed pattern. It is noted that the diffraction grating diffractively separates the incident beams 50, 54 into their wavelength component, and it also diffractively combines the respective wavelength components into the exiting beams 52, 56. In the linear reciprocal system of FIG. 5, the four beams 50, 52, 54, 56 will be similarly explained as though they were propagating in a single direction. The illustration of FIG. 5 does not show the lenses at the exterior ends of the four beams which substantially collimate those beams so that resolution of the diffraction grating is increased. Also not shown are the fibers coupled to the beams and possibly folding mirrors to reduce the overall size of the system.

The grating 24 diffracts each of the four beams 50, 52, 54, 56 into their respective wavelength components towards the lens 25, which focuses the different wavelength components towards the respective micro-mirrors $28_1$, $28_2$. Only two micro-mirrors 28 are illustrated here. For an N-wavelength WDM system, N micro-mirrors 28 are required. The micro-mirror 28 for each wavelength has two positions. The technology for fabricating such mirrors is disclosed by: (1) Lornbeck in "Deformable-mirror spatial-light modulators," *Proceedings of the SPIE*, vol. 1150, August 1989, pp. 86–102; (2) Boysel et al. in "Integration of deformable mirror devices with optical filters and waveguides," *Proceedings of the SPIE*, vol. 1793, Integrated Optics and Microstructures, 1992, pp. 34–39; and (3) Peterson, "Micromechanical light modulator array fabricated on silicon," *Applied Physics Letters*, vol. 31, 1977, p. 521. Foundry service and design information are available from the MEMS Technology Application Center, MCNC, Research Triangle Park, N.C. The information is available on the Internet at http://www.mcnc.org/mumps.html.

The following discussion with respect to the mirror reflections will refer to the beams 50, 52, 54, 56 prior to the grating 24, but it is understood that the corresponding wavelength-separated beam is intended. In the first position, the micro-mirror 28 reflects the light it receives from the input beam 50 to the output beam 52. In the second position, the micro-mirror 28 reflects the light it receives from the input beam 50 to the drop beam 56 and reflects the light it receives from the add beam 54 to the output beam 52.

The wavelength-components of any beam reflected from the mirrors $28_1$, $28_2$ are collimated by the lens 25, and the diffraction grating 24 recombines them into the output beam 52 and drop beam 56. The beams 50, 52, 54, 56 directly correspond to the four ports of the desired wavelength-division add/drop multiplexer. No circulators are required.

The angular distributions of the beams at the micro-mirror 28 are illustrated by FIGS. 6A and 6B. In the first position illustrated in FIG. 6A, the mirror normal 42 is directed midway between the input and output beams 50, 52. That is, the mirror normal 42 is coincident with the bisector of the angle between the input and output beams 50, 52. In this position, the input beam 50 is reflected to the output beam 52. Also in this position, the add beam 54 is reflected to a spurious drop beam 60, and the drop beam is reflected to a spurious add beam 62. In an ADM, these spurious beams 60, 62 are only a nuisance to be absorbed if necessary. In the second position, the mirror normal 42 is located midway between the output beam 52 and the add beam 54 and also midway between the input beam 50 and the drop beam 56, thereby reflecting the input beam 50 to the drop beam and reflecting the add beam 54 to the output beam 52.

The beams illustrated in FIGS. 6A and 6B have been arranged in a square configuration. However, it is also possible to arranged them in a rectangular configuration. Indeed, the beams 50, 52, 54, 56 may be arranged in a parallelepiped arrangement illustrated in FIG. 7. A parallelepiped is a quadrilateral figure having two pair of opposed sides. Within a pair, the opposed sides are parallel and of equal length, but there is no additional restriction between the pairs. For an add/drop, the input and drop beams have to be on the opposed corners of the parallelepiped, and the add and output beams have to be on the other opposed corners. The first position $42_1$ is located between the input and output beams 50, 52, and the second position $42_2$ is located at the midpoint between input and drop beams 50, 56, which is also the midpoint between the add and output beams 54, 52. Strictly speaking, the above description of rectangular and parallelepipedal arrangements is not completely accurate in the space between the lens 25 and the micro-mirror array 26 since these planar features are being mapped onto a spherical surface 40. The description in terms of angular arcs passing through the mirror normal in its two positions is more accurate.

This invention is not limited to a single add/drop but may extended to multiple add/drops. A dual add/drop is the most immediately useful and is applicable to dual-ring communication networks. In a dual-ring network, two fibers run in parallel around a ring, and signals propagate in anti-parallel directions on the two ring. In the simplest example, the first fiber serves as a protection fiber for the primary working fiber. Even if both fibers are cut at the same point in the ring, traffic can be rerouted to all nodes on the ring. The dual add/drop includes a similar adding and dropping function synchronously performed on both fibers.

The beams for the first ring fiber will be labeled by 50-1, 52-1, 54-1, 56-1 in correspondence to the labeling of FIGS. 5 through 7; those for the second ring fiber, by 50-2, 52-2, 54-2, 56-2. The beams external to the dual add/drop are arranged in a 2×8 array with the beams for the second fiber arranged outside those for the first ring fiber with all the input and output beams arranged along one long side of the array and all the add and drop beams arranged along the other long side. All eight beams use the same grating 24, lens 25, and micro-mirror array 26, as in FIG. 5.

The angular distributions of the beams at a micro-mirror for a dual add/drop are illustrated in FIGS. 8A and 8B. The positions of the mirror normal 42 with respect to the beams 50-1, 52-1, 54-1, 56-1 of the first ring fiber are the same as for the system of FIGS. 5, 6A, and 6B, whether in the first or the second position of the mirror. In the first position of FIG. 7A, the mirror 28 reflects the first input beam 50-1 to the first output beam 52-2 and simultaneously reflects the second input beam 50-2 to the second output beam 52-2. In the second position of FIG. 7B, the mirror reflects the first add beam 54-1 to the first output beam 52-1 and reflects the first input beam 50-1 to the first drop beam 56-1. Simultaneously, it reflects the second add beam 54-2 to the second output beam 52-2 and reflects the second input beam 50-2 to the second drop beam 56-2. There is no inherent mixing of the signals associated with the first and second ring fibers. Obviously, the dual add/drop provides substantial savings over two single add/drops.

For the dual add/drop, the arrangement of the beams may vary somewhat between the first and second ring fiber. The replication of beams can be extended to further ring fibers or the like, but the optics become increasingly difficult.

The preceding embodiments have relied upon arrays of tiltable mirrors having two positions providing a selection of passing through the input beam to the output beam or of coupling the input and output beams respectively to a single set of drop and add beams. As mentioned previously, it is desirable to provide multiple sets of drop and add beams for the client interface. This can be accomplished by the use of tiltable mirrors having three or more positions.

Figure 2:
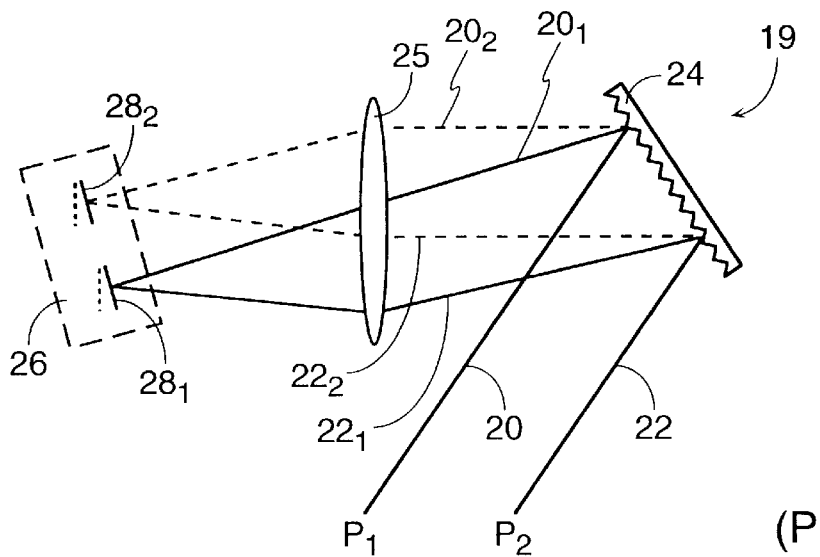
FIG. 2 is a schematic illustration of the optics of a prior-art wavelength-division add/drop multiplexer (WADM).
Figure 3:
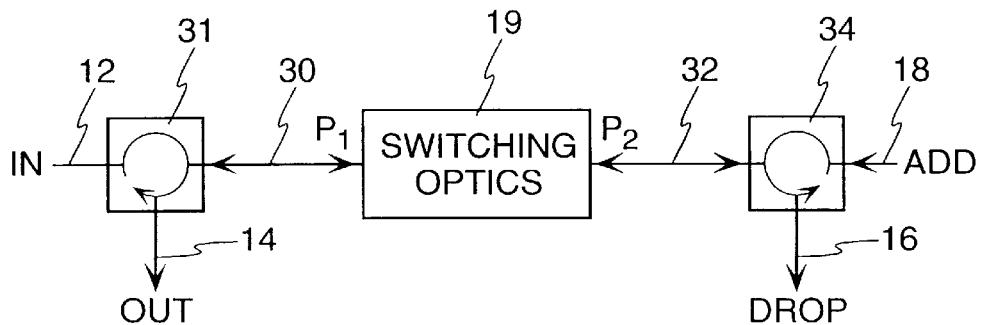
FIG. 3 is a schematic illustration of the WADM of FIG. 2.

A first embodiment of a multi-add/drop ADM illustrated in FIG. 9 follows the apparatus of Ford et al., which is illustrated in FIGS. 2 and 3. For each micro-mirror 28 in the micro-mirror array 26, there is one central input/output beam 20 bracketed by two add/drop beams 22-1, 22-2. The input/output beam 20, after collimation by the lens 25 and wavelength dispersion by the grating 24 is associated with the first port $P_1$ of the switching optics 19 while the two add/drop beams 22-1, 22-2 are respectively associated with two second ports $P_{2-1}$, $P_{2-2}$, each having its own circulator 34 and input and output lines 16, 18.

In this embodiment, the micro-mirror 28 has three possible positions. In a first position 70, its normal is coincident with the input/output beam 20 so as to retroreflect the input to the output. In a second position 72, its normal is coincident with the angular bisector of the input/output beam 20 and the first add/drop beam 22-1 so as to transreflect signals between those two beams. In a third position 74, its normal is coincident with the angular bisector of the input/output beam 20 and the second add/drop beam 22-2 so as to transreflect signals between these two beams.

Figures 10A, 10B, 10C:
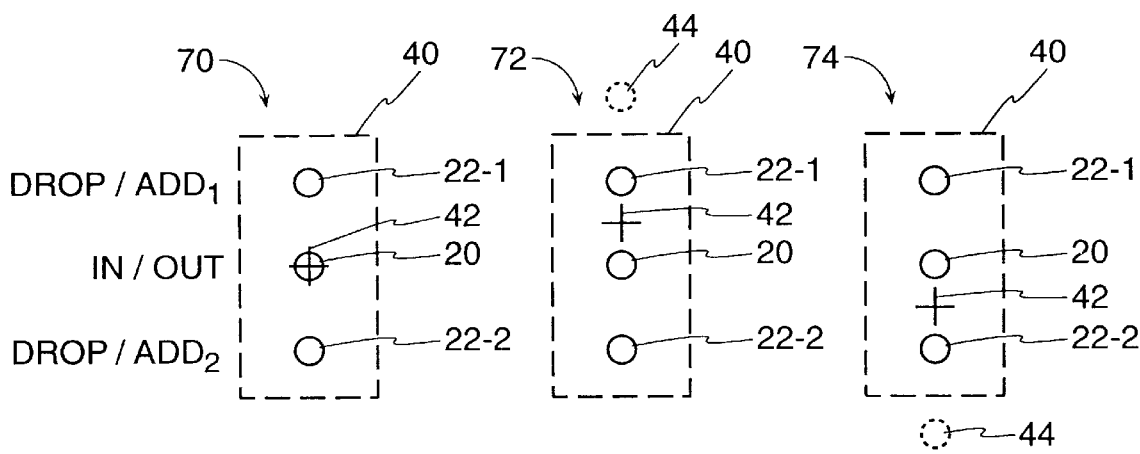
FIGS. 10A, 10B, and 10C show the angular arrangements of the beams and mirror normal for the embodiment of FIG. 9.

The angular relationships between the beams in the various positions are illustrated in FIGS. 10A, 10B, and 10C. In the first mirror position 70 illustrated in FIG. 10A, the mirror normal 42 is incident with the input/output beam 20 so as to retroreflect any light. In this position, however, the two drop/add beams 22-1, 22-2 are reflectively coupled. This is generally not a desired coupling, and the management of the add/drop network element should be designed to prevent either the transmission or reception of such coupled signals. In the second mirror position 72 illustrated in FIG. 10B, the mirror normal 42 is directed midway between the input/output beam 20 and the first add/drop beam 22-1 so as to reflectively couple them. As a result, the input beam is coupled to the first drop beam, and the first add beam is coupled to the output beam. This configuration also couples the second add/drop beam 22-2 to an undesired spurious beam 44, which may require special absorption of the spurious beam 44. Similarly, in the third mirror position 74, illustrated in FIG. 10C, the mirror normal 42 is directed to between the input/output beam 20 and the second add/drop beam 22-2 to thereby reflectively coupled those two beams 20, 22-2. Again disadvantageously, the first add/drop beam 22-1 is reflectively coupled to a spurious beam 44.

Figure 11:
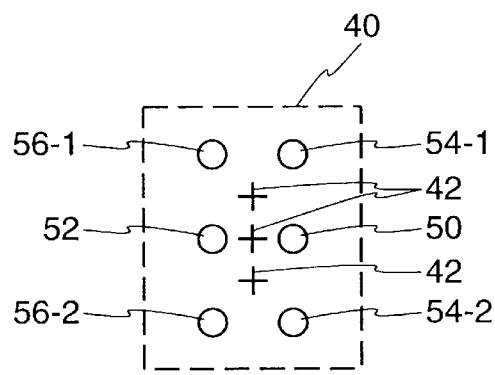
FIG. 11 shows the extension of the embodiment of FIGS. 9 and 10A through 10B to separated input and output beams and separated add and drop beams.

The extension of the dual add/drop ports to the embodiment of FIG. 5 is straightforward, as illustrated in FIG. 11 for the relative angular orientations of the six beams and the mirror normals. There is one input beam 50, one output beam 52, a first and a second add beam 54-1, 54-2, and a first and a second drop beam 56-1, 56-2. These beams are arranged in a rectangular 2×3 array, but the array may be in the form of a parallelepiped. The mirror normal 44 may have three positions, the first position between the input and output beams 50, 52, the second position at the central bisector of the input and output beams 50, 52 and the first add and drop beams 54-1, 56-1, and the third position at the central bisector of the input and output beams 50, 52 and the second add and drop beams 54-2, 56-2. These six beams are optically coupled to six fibers or other optical paths at the exterior of the WADM.

Figure 12:
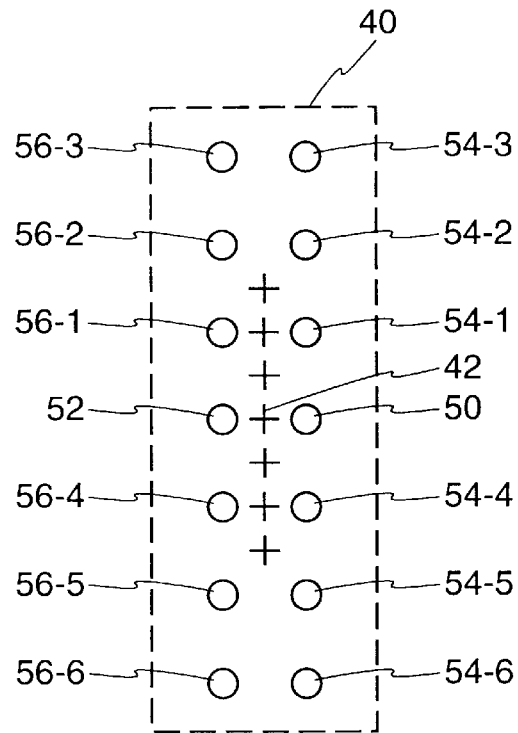
FIG. 12 illustrates the arrangement of beams and mirror normals for a large number of add and drop beams.

The extension of FIGS. 9, 10A–10C, and 11 can be extended to yet more positions of the tiltable mirrors and more than two sets of add/drop lines. A beam configuration for a multiple add/drop for an ADM is illustrated in FIG. 12. The add and drop beams 50, 52 are arranged in a 2×7 regular rectangular array with first through sixth add beams 54-1 through 54-6 and first through six drop beams 56-1 through 56-6. The tiltable mirror 28 can assume any of seven positions indicated by the mirror normals 42 illustrated in the figure. In the first position, with the mirror normal between the input and output beams 50, 52, those two beams are reflectively coupled. In each of the remaining six positions, the input beam 50 is reflectively coupled to a selected one of the six drop beams 56-1 through 56-6 while the output beam 52 is reflectively coupled to a corresponding one of the six add beams 54-1 through 54-6. The position of the input and output beams 50, 52 within the 2×7 array is fairly arbitrary as long as they are vertically paired.

Figure 13:
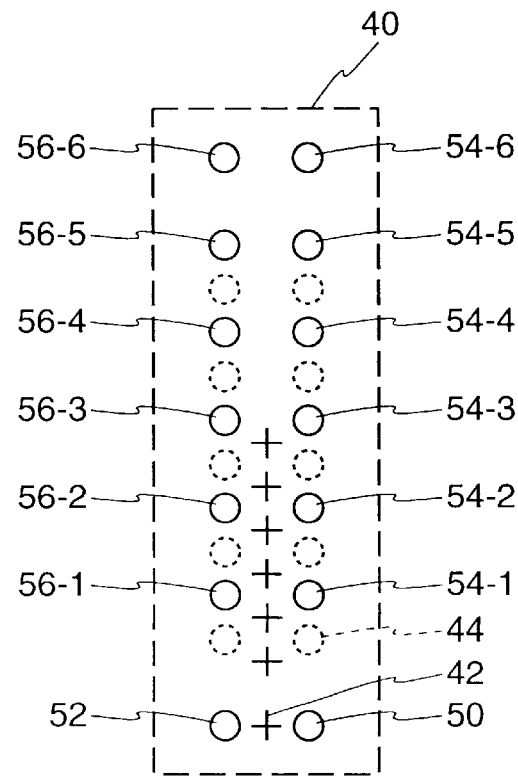
FIG. 13 illustrates an improvement on the arrangement of FIG. 13 that eliminates spurious coupling between add and drop beams.

The configurations of FIGS. 10A, 11, and 12 produce undesirable coupling between different ones of the drop and add lines. Although the coupling can be avoided through a systems approach of inactivating the so coupled lines, another solution rests on the fact that the undesired couplings arise from the regular arrangement of all the beams. One example of the angular beam arrangement for six add and drop beams which are not extraneously coupled is illustrated in FIG. 13. The six add beams 54-1 through 54-6 and the six drop beams 56-1 through 56-6 are arranged in a regular rectangular 2×6 array with the vertical spacings being at least two beam widths at the diffraction grating and at the parallel beams external to the WDM. The add and drop beams 50, 52 are positioned with respect to this add/drop array but are spaced from them by a vertical spacing other than an even multiple of add/drop vertical spacing. As an example, let the input and output beams be vertically located at a height of 0, let the first drop and add beams 54-1, 56-2 be located at a height of 3, and let the vertical add/drop spacings be 2, all the distances being in arbitrary or normalized units.

The micro-mirror can assume any of seven positions. In the first position, the mirror normal 42 falls at a height of 0 between the input and output beams 50, 52 and reflectively couple them. In the second position, the mirror normal 42 falls at a height of 1½ so that the mirror 28 couples the input beam to the first drop beam 56-1 and couples the output beam 52 to the first add beam 54-1. The remaining positions of the mirror normal 42 fall at 2½, 3½, 4½, and 5½. In no case is an add beam 54 reflectively coupled to a drop beam 56. Spurious beams 44 do fall within the area of the array, as indicated by dotted circles, but the spurious beams 44 are located between the add and drop beams 54, 56. Other irregular arrangement of beams is possible, as is now apparent to the ordinary artisan. In particular, in the three-beam arrangement of FIGS. 9 and 10A through 10C and in the six-beam arrangement of FIG. 11, spurious add/drop coupling can be eliminated by different vertical spacings between the middle and top beams than between the middle and bottom beams.

Although a conventional reflective diffraction grating has been shown, other wavelength dispersive media may be used, such as a transmissive diffraction grating or a hologram that additionally includes focusing functions.

The invention thus provides an compact and economical optical add/drop circuitry, and one providing flexibility in its design.

What is claimed is:

1. An optical switching system, comprising:

at least four optical beams;

a wavelength-dispersive medium dispersing wavelength components of said at least four optical beams incident thereupon into respective wavelength-dispersed sub-beams;

an array of tiltable mirrors having reflective surfaces angularly movable between a first position and a second position; and a lens focusing said sub-beams of a respective wavelength upon a respective one of said mirrors;

wherein a respective one of said mirrors:

in said first position, optically couples a first one to a second one of said respective sub-beams; and in said second position, optically couples said first one to a third one of said respective sub-beams and optically couples said second one to a fourth one of said respective sub-beams.

2. The switching system of claim 1, wherein said at least four optical beams consists of four generally parallel optical beams arranged in a parallelepipedal arrangement.

3. The switching system of claim 2, wherein said parallelepipedal arrangement is a rectangular arrangement.

4. The switching system of claim 1, further comprising a multi-wavelength optical communications network having a switching node, wherein of said four optical beams:

a first one corresponding to said first sub-beams is connected to an input port of said switching node;

a second one corresponding to said second sub-beams is connected to an output port of said switching node;

a third one corresponding to said third sub-beams is connected to a drop port of said switching node; and a fourth one corresponding to said fourth sub-beams is connected to an add port of said switching node.

5. The switching system of claim 1, wherein said at least four optical beams comprise eight optical beams.

6. The switching system of claim 5, wherein said eight optical beams are arranged in a rectangular arrangement.

7. The switching system of claim 5, further comprising a multi-wavelength optical communications network having two counter-rotating optical paths and a switching node connected to said two optical paths, wherein of said optical beams:

first and fifth ones corresponding to said first sub-beams are connected to respective input ports of said switching node connected respectively to said first and second optical paths;

second and sixth ones corresponding to said second sub-beams are connected to respective output ports of said switching node connected respectively to said first and second optical paths;

third and seventh ones corresponding to said third sub-beams are connected to respective drop ports of said switching node connected respectively to said first and second optical paths; and fourth and eighth ones corresponding to said fourth sub-beams are connected to respective add ports of said switching node connected respectively to said first and second optical paths.

8. The switching system of claim 1, wherein said at least four optical beams comprise six optical beams;

wherein said mirrors in said array are angularly movable between said first position, said second position, and a third position; and wherein said respective one of said mirrors in said third position optically couples said first one to a fifth one of said respective sub-beams and optically couples said second one to a sixth one of said respective sub-beams.

9. The switching system of claim 8, wherein said six beams are arranged in two linearly arranged triplets, spacings between said beams in each of said triplets being non-equal.

10. The switching system of claim 1, wherein said mirrors are integrated in a silicon substrate.

11. An optical switching system, comprising:

three optical beams;

a wavelength-dispersive medium dispersing wavelength components of said three optical beams incident thereupon into respective wavelength-dispersed sub-beams;

an array of tiltable mirrors having reflective surfaces angularly movable between a first position, a second position, and a third position; and a lens focusing said sub-beams of a respective wavelength upon a respective one of said mirrors;

wherein a respective one of said mirrors:

in said first position, optically reflects a signal received from a first one of said respective sub-beams back to said first one of said respective sub-beams;

in said second position, optically couples said first one to a second one of said respective sub-beams; and in said third position, optically couples said first one to a third one of said respective sub-beams.

12. The switching system of claim 11, wherein said three beams are propagating generally in parallel within a plane.

13. The switching system of claim 12, wherein said beams are unequally spaced in said plane.

14. A communications network, comprising a first optical path including optical fiber and a switching node including an optical switch comprising:
- a first optical beam receiving an input signal from said first optical path;
- a second optical beam transmitting output signal to said first optical path;
- a third optical beam for selectively receiving said input signal from said first optical path and transmitting it to a third optical path;
- a fourth optical beam for selectively receiving an add signal from a fourth optical path and transmitting it to said first optical path;
- a wavelength-dispersive medium dispersing wavelength components of said four optical beams incident thereupon into respective wavelength-dispersed sub-beams;
- an array of tiltable mirrors having reflective surfaces angularly movable between a first position and a second position; and
- a lens focusing said sub-beams of a respective wavelength upon a respective one of said mirrors;

wherein a respective one of said mirrors:
- in said first position, optically couples a first one to a second one of said respective sub-beams; and
- in said second position, optically couples said first one to a third one of said respective sub-beams and optically couples said second one to a fourth one of said respective sub-beams.

15. A switching method, comprising the steps of:

for a first, a second, a third, and a fourth beam, wavelength dispersing each of said beams into a plurality of corresponding first, second, third, and fourth sub-beams of different wavelengths;

directing each of said sub-beams having a respective wavelength toward a respective one of a plurality of mirrors;

selectively tilting each of said mirrors between two positions, wherein, in said first position, said respective mirror optically couples said respective first and second sub-beams, and wherein, in said second position, said respective mirror optically couples said respective first and third sub-beams and optically couples said respective second and fourth sub-beams.

* * * * *